United States Patent [19]

Burger

[11] Patent Number: 5,072,181

[45] Date of Patent: Dec. 10, 1991

[54] ANGLE POSITION TRANSMITTER HAVING A STATIC MAGNETIC FIELD SENSOR AND A MAGNET ON THE TRANSMITTER SHAFT FOR DETECTING A FULL REVOLUTION OF THE TRANSMITTER SHAFT

[75] Inventor: Wilheim Burger, F/rth, Fed. Rep. of Germany

[73] Assignee: Siemens Aktiengesellschaft, Berlin & Munich, Fed. Rep. of Germany

[21] Appl. No.: 132,391

[22] Filed: Dec. 15, 1987

[30] Foreign Application Priority Data

Dec. 22, 1986 [DE] Fed. Rep. of Germany ....... 3644043

[51] Int. Cl.⁵ .................................................. G01B 7/30
[52] U.S. Cl. ............................. 324/207.25; 324/207.2
[58] Field of Search ............... 324/207, 208, 226, 227, 324/234, 235, 236, 239, 251, 252, 260–262, 165, 166, 162, 173, 174, 175, 178, 179; 73/862.33, 862.31, 862.34, 862.35

[56] References Cited

U.S. PATENT DOCUMENTS

| | | | |
|---|---|---|---|
| 3,345,812 | 10/1967 | Pickering | 324/175 X |
| 3,870,911 | 3/1975 | Toyama et al. | 324/174 X |
| 4,174,641 | 11/1979 | Hillman | 324/175 X |
| 4,228,396 | 10/1980 | Palombo et al. | 324/163 |
| 4,259,637 | 3/1981 | Bloomfield et al. | 324/173 X |
| 4,321,495 | 3/1982 | Kennedy | 324/174 X |
| 4,392,375 | 7/1983 | Eguchi et al. | 324/208 X |
| 4,432,253 | 2/1984 | Kerlin | 324/208 X |
| 4,448,275 | 5/1984 | Kitagawa et al. | 73/862.33 X |
| 4,459,750 | 7/1984 | Affa | |
| 4,466,189 | 8/1984 | Tobin, Jr. | 324/208 X |
| 4,570,118 | 2/1986 | Tomczak et al. | 324/208 |
| 4,591,788 | 5/1986 | Mohri et al. | 324/262 X |
| 4,596,953 | 6/1986 | Nagasaka et al. | 324/262 X |
| 4,646,088 | 2/1987 | Inoue | 324/207 X |
| 4,667,156 | 5/1987 | Machino et al. | 324/173 |
| 4,703,262 | 10/1987 | Fujioka et al. | 324/208 |
| 4,724,710 | 2/1988 | Murty | 324/208 X |

FOREIGN PATENT DOCUMENTS

| | | |
|---|---|---|
| 3408478 | 1/1985 | Fed. Rep. of Germany . |
| 59-158604 | 9/1984 | Japan . |
| 60-244559 | 12/1985 | Japan . |
| 1026535 | 4/1966 | United Kingdom . |
| 1274308 | 5/1972 | United Kingdom . |
| 1453728 | 11/1973 | United Kingdom . |
| 1484796 | 2/1975 | United Kingdom . |
| 1386020 | 3/1975 | United Kingdom . |
| 03628 | 11/1982 | World Int. Prop. O. . |

Primary Examiner—Kenneth A. Wieder
Assistant Examiner—W. Edmonds
Attorney, Agent, or Firm—Kenyon & Kenyon

[57] ABSTRACT

In an angle position transmitter with a photoelectrically scannable transmitter disc and doubly supported transmitted shaft, the angle position transmitter determines the angle position of a rotary machine element so as to indicate absolute position with less than a full revolution. The measuring range is increased several times without adversely affecting the compact design of the angle position transmitter which is already limited by the need for a double support of the transmitter shaft. A magnet revolving with the transmitter shaft signals full revolutions of the transmitter shaft at a stationary magnetic field sensor. The full rotations are counted in a revolution counter. A sign is determined by the direction of motion. The magnet rotates in the dead space between two antifriction bearings of a transmitter shaft. The angle position transmitter is particularly well suited for use in machine tools, robots and motor vehicles.

6 Claims, 1 Drawing Sheet

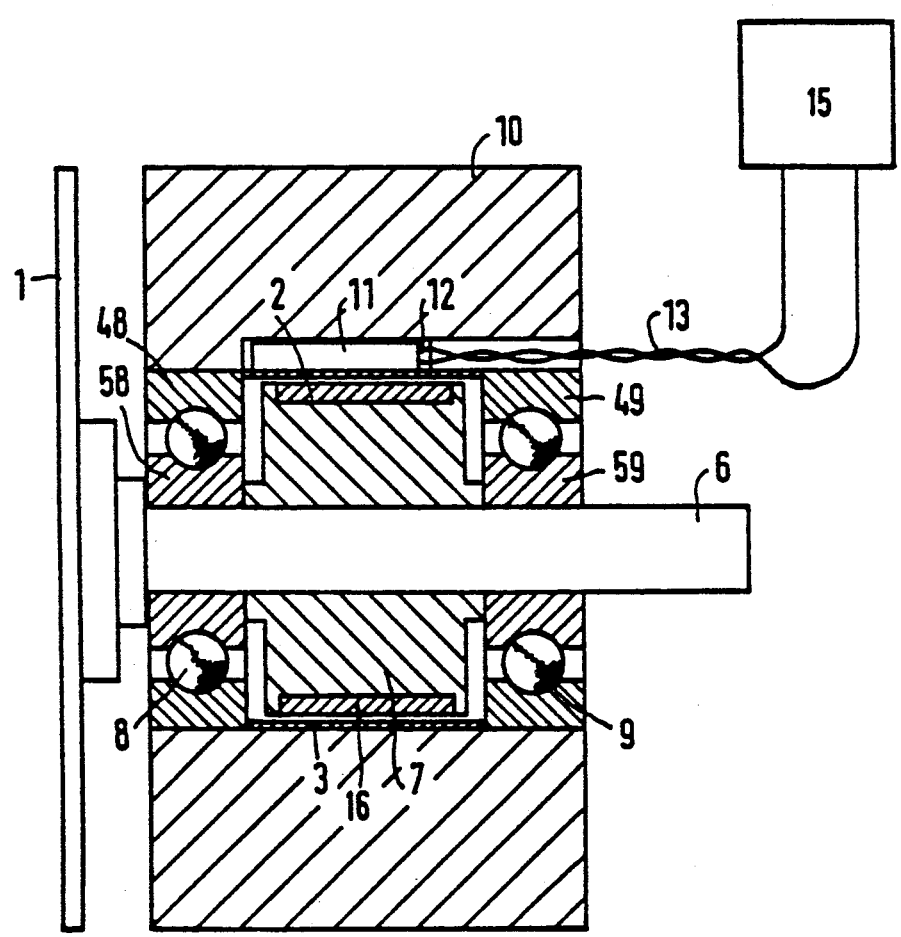

ANGLE POSITION TRANSMITTER HAVING A STATIC MAGNETIC FIELD SENSOR AND A MAGNET ON THE TRANSMITTER SHAFT FOR DETECTING A FULL REVOLUTION OF THE TRANSMITTER SHAFT

BACKGROUND OF THE INVENTION

1. Field of the Invention

The invention relates to an angle position transmitter for determining the angle position of a rotatable machine part.

2. Description of Related Knowledge

Angle position encoders are used in areas such as machine tools, robotics and automotive engineering to determine the angle position of a rotatable shaft relative to a reference position. A main component of an angle position transmitter is a transmitter disc which can be scanned photoelectrically. The transmitter disc carries tracks to indicate the rotary motion of the machine part being monitored as transferred by a mechanically coupled transmitter shaft. Modern transmitter discs require a high resolution and a large number of tracks. Mechanical play of the transmitter shaft must be avoided to reliably obtain high resolution. The transmitter shaft of a modern angle position transmitter is typically supported by at least two antifriction bearings such as ball bearings that are, space permitting, pretensioned against each other to prevent play.

In addition to physical and mechanical problems, an angle position transmitter has the disadvantage that it can indicate absolutely angle positions only within the range of one revolution (360°).

SUMMARY OF THE INVENTION

It is the object of the present invention to make an angle position transmitter that has a measuring range that goes beyond a full revolution and is nevertheless structurally compact.

According to the present invention, at least one revolving magnet is placed on the transmitter shaft between at least two antifriction ball bearings. A stationary magnetic field sensor or reed contact may comprise the stationary magnetic field sensor and be positioned in an axial slot or drill hole of the bearing housing. A thin, magnetically permeable tension sleeve can be positioned between the outer bearing rings so that the magnet rotates with the transmitter shaft a small distance from the inside wall of the housing. One or more setting magnets can also rotate with the transmitter shaft.

The present invention increases the measuring range of the angle position transmitter to a multiple of a full revolution without a substantial increase of the dimensions of the transmitter. It is not necessary to extend the transmitter shaft. The diameter of a transmitter housing need not change. Rather than add a revolution counter to an existing design of an angle position transmitter, the present invention provides an integrated solution.

The use of a Wiegand sensor or a pulse wire as a magnetic-field sensor permits the sensor to operate independently of a supply voltage. Unlike induction sensors, a Wiegand or pulse wire sensor furnished voltage pulses that have an amplitude that is independent of the relative velocity between the fixed and the moving part of the measuring system. The counting of full revolutions can thus continue if the angle position transmitter loses power as long as the corresponding evaluation device continues to receive power. These sensors are characterized by small space requirements and high safety against interference. Wiegand sensors are described in German application 3544452. Regarding the physics of "Pulse Wires as Magnetic Transmitters for Motion and Field Sensors", reference is made to Siemens Forschungs - und Entwicklungsbericht, Vol. 15 (1986) No. 3, pages 135 to 144.

An arrangement of the stationary magnetic field sensor in an axial slot or drill hole of the bearing housing that encloses the antifriction bearing serves to prevent magnetic short circuits. The use of a magnetically permeable tensioning sleeve for tensioning the antifriction bearings without play results in a reliable action of the magnet corotating with the revolving magnet on the stationary magnetic field sensor. A setting magnet rotating with the transmitter shaft can be added to cyclically place the stationary magnetic field sensor in a defined premagnetization state.

BRIEF DESCRIPTION OF THE DRAWING

FIG. 1 shows a cross section through an angle position transmitter of the present invention that has a transmitter disc and doubly supported transmitter shaft.

DETAILED DESCRIPTION

A photoelectrically scannable transmitter disc 1 is driven by a transmitter shaft 6 which is in turn mechanically coupled to a rotatable machine part, not shown. Two ball bearings 8, 9 and stationary outer bearing rings 48 and 49 are fitted in bearing housing 10 having inner bearing rings 58 and 59, respectively, to support transmitter shaft 6 without play. The inner bearing rings 58, 59 revolve with the transmitter shaft 6. To prevent play, the ball bearings 8, 9 are tensioned against each other. Tensioning sleeve 3 keeps the ball bearings at a fixed minimum spacing.

The narrow space between the tensioning sleeve 3 and the transmitter shaft 6, tolerated to date as a dead space, is now utilized for accommodating a magnet 2 that revolves with transmitter shaft 6. Magnet 2 is preferably not mounted directly on the transmitter shaft 6 but in a magnet receptacle 7 so that the magnet 2 revolves with a spacing as small as practical from the inside wall of the tensioning sleeve 3. Each revolution of magnet 2 causes it to act on stationary magnetic field sensor 11. The stationary magnetic field sensor is mounted in a chamber such as an axial slot 12 or drill hole of the bearing housing 10. This effect increases the closer the magnet 2 passes to magnetic field sensor 11. The wall thickness of the tensioning sleeve 3 is therefore preferably thin. Bearing housing 10 adds additional mechanical strength. The material forming tension sleeve 3 is preferably permeable to magnetic fields so that a sharp pulse is obtained when the magnet 2 passes magnetic field sensor 11. Tension sleeve 3 may comprise any suitable material such as brass.

A pulse which occurs with each revolution of the transmitter shaft 6 or the transmitter disc 1 is fed via the sensor line 13 to a revolution counter in block 15 and summed with a detected sign determined by the direction of motion. The bidirectional counter of block 15 thus determines absolute position beyond the range of one full revolution of the transmitter disc 1.

For scanning rotary motions at low speed, a reed contact can be used as a stationary magnetic field sensor 11. A Wiegand sensor or pulse wire also may be used as the stationary magnetic field sensor 11. These last two types of sensors have small dimensions that allow the shaft encoder to remain extremely compact. These sensors are insensitive to electromagnetic interference and do not require an independent voltage supply. Full revolutions can thus be counted as long as at least the revolution counter is supplied with power even if the supply voltage of the angle position transmitter fails. The amplitude of the voltage pulses supplied by a Wiegand sensor is independent of the relative velocity of magnet 2. Counting pulses are thus reliably generated at very high speeds of revolution. In addition, such contactless sensors are immune to wear.

If magnetic-field sensor 11 must be set in a defined premagnetization state before it can deliver a pulse when the magnet 2 passes by, the magnet receptacle 7 mounted on transmitter shaft 6 is additionally equipped with a setting magnet 16 having a polarity that is, for example, the opposite of magnet 2.

What is claimed is:

1. An angle position transmitter for determining a position angle for a rotatable machine, comprising:
    a transmitter shaft for transmitting rotary motion from the machine part;
    a photoelectrically scannable transmitter disc mounted on said transmitter shaft, for detecting the angle position of the shaft within one revolution;
    at least two anti-friction bearings positioned along said transmitter shaft supporting said shaft;
    at least one magnet arranged on said transmitter shaft between said bearings so as to rotate with said transmitter shaft and make full rotations; and
    at least one stationary magnetic field sensor for detecting a full revolution of said magnet and indicating the direction of the rotation of said transmitter shaft.

2. An angle position transmitter as claimed in claim 1, wherein said stationary magnetic field sensor is chosen from the group consisting of a Wiegand sensor, a pulse wire or a reed contact.

3. An angle position transmitter as claimed in claim 1 further comprising a bearing housing enclosing said bearings, said bearing housing including a chamber receiving said magnetic field sensor.

4. An angle position transmitter as claimed in claim 1, further comprising:
    outer bearing rings for said bearings; and
    a thin stationary tensioning sleeve positioned between said outer bearing rings and between said magnet and said stationary magnetic field sensor, said tensioning sleeve being magnetically permeable and positioned such that said magnet rotates at the smallest practical distance from an inside wall of said tensioning sleeve.

5. An angle position transmitter as claimed in claim 1, further comprising a setting magnet for said stationary magnetic-field sensor that rotates with said transmitter shaft, having a polarity which is opposite to said magnet arranged on said transmitter shaft.

6. An angle position transmitter as claimed in claim 1, further comprising a bidirectional revolution counter that is connected to said stationary magnetic field sensor to count the full rotations of the magnet and generate an output signal in response thereto, said output signal being indicative of the direction of said rotation.

* * * * *